G. McWilliams.
Churn.
No 73023. Patented Jan. 7, 1868.
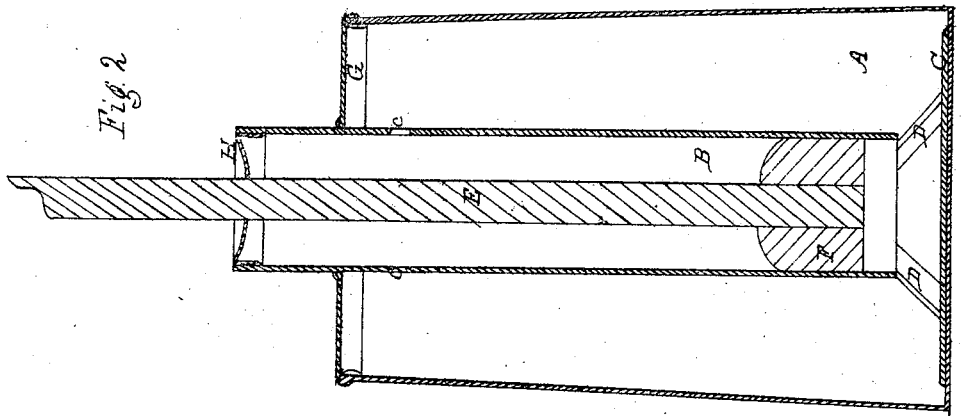
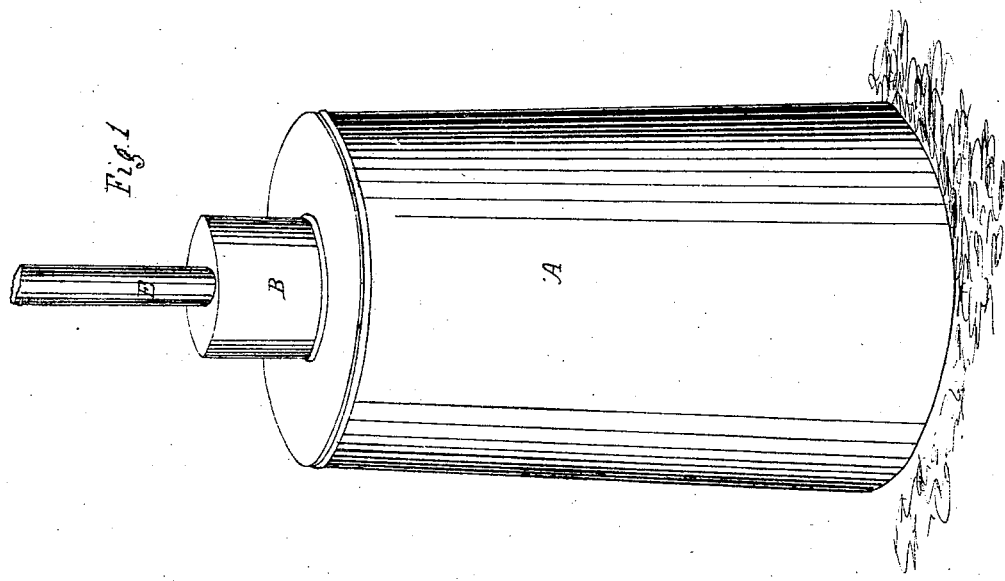
Witnesses
J. H. Burridge
J. Holmes
Inventor
G. W. McWilliams

United States Patent Office.

GABRIEL McWILLIAMS, OF FOSTORIA, OHIO.

Letters Patent No. 73,023, dated January 7, 1868.

IMPROVEMENT IN CHURNS.

The Schedule referred to in these Letters Patent and making part of the same.

TO ALL WHOM IT MAY CONCERN:

Be it known that I, GABRIEL McWILLIAMS, of Fostoria, in the county of Seneca, and State of Ohio, have invented certain new and useful Improvements in Churns; and I do hereby declare that the following is a full and complete description of the same, reference being had to the accompanying drawings, making a part of this specification, in which—

Figure 1 is a perspective view of the churn.

Figure 2 is a vertical section.

Like letters of reference refer to like parts in the views.

A, fig. 1, is a case or body of the churn, in which is placed a tube, B. This tube is secured to a base, C, and elevated above the same by the braces D, thus leaving a space between the end of the tube and base or bottom of the churn. E is a shaft, to the lower end of which is attached a piston or dasher, F, fitted closely to the tube. The churn and tube are both provided with a cover, G H, and, as it will be seen, the tube is made to pass through the cover G, and the shaft through that of the tube.

The practical operation of this churn is as follows: The cream, on being thrown into the case around the tube, is then violently agitated by operating the dasher or piston F, which, on being drawn up the tube, the cream follows, but which is again forced out by plunging down the dasher, thereby forcing the cream violently out below and again drawing it up, and repeating the downward action of the piston. By this means the whole body of the cream is most thoroughly agitated, and the work of churning quickly accomplished.

On drawing up the piston above the openings c, made in the sides of the tube, air will pass in above the cream, which will then be forced down into the cream, and by this means violently agitate it and bring the butter, either of which operations accomplishes the feat of churning in a very short time, and in the most satisfactory manner.

The operation of this churn is simple, easy, and very effectual in the results to be obtained.

What I claim as my improvement, and desire to secure by Letters Patent, is—

The tube B, piston F, as arranged in combination with the case A, and operated in the manner as and for the purpose set forth.

GABRIEL McWILLIAMS.

Witnesses:
S. M. MILLER,
J. W. NESTLEROAD.